(12) United States Patent
Aldraihem

(10) Patent No.: US 8,525,507 B2
(45) Date of Patent: Sep. 3, 2013

(54) METHOD AND SYSTEM FOR MONITORING EXTERNAL EXCITATION ON A SURFACE USING NANOCOMPOSITE PAINT

(75) Inventor: Osama J Aldraihem, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 554 days.

(21) Appl. No.: 12/763,763

(22) Filed: Apr. 20, 2010

(65) Prior Publication Data

US 2011/0254535 A1  Oct. 20, 2011

(51) Int. Cl.
  *G01R 31/02* (2006.01)
  *G01W 1/16* (2006.01)
(52) U.S. Cl.
  CPC .................................. *G01W 1/16* (2013.01)
  USPC .......................................................... 324/72
(58) Field of Classification Search
  None
  See application file for complete search history.

(56) References Cited

U.S. PATENT DOCUMENTS

| | | | | |
|---|---|---|---|---|
| 7,536,911 B2 * | 5/2009 | Kim | | 73/587 |
| 7,575,778 B2 * | 8/2009 | Su et al. | | 427/101 |
| 7,947,955 B2 * | 5/2011 | Kawano et al. | | 250/341.1 |
| 7,989,725 B2 * | 8/2011 | Boddie et al. | | 200/600 |
| 8,148,688 B2 * | 4/2012 | Kawano et al. | | 250/338.1 |
| 8,253,104 B2 * | 8/2012 | Kawano et al. | | 250/336.1 |
| 2008/0216558 A1 * | 9/2008 | Koyilothu et al. | | 73/24.06 |

FOREIGN PATENT DOCUMENTS

JP   2010019585 A  *  1/2010

* cited by examiner

*Primary Examiner* — Paresh Patel
(74) *Attorney, Agent, or Firm* — Timberline Patent Law Group PLLC

(57) ABSTRACT

The present invention provides a method and system for monitoring external excitation on a surface using nanocomposite paint. The method comprises applying the nanocomposite paint on the surface, wherein the nanocomposite paint comprises a mixture of a plurality of carbon nanotubes and an epoxy resin along with a plurality of electrically conductive patterned electrodes. The electrical properties of the nanocomposite paint changes in response to the external excitation of the surface. The change in the electrical properties of the nanocomposite is measured by a measuring instrument, wherein the change in the electrical properties of the nanocomposite paint is directly proportional to the external excitation experienced by the surface.

20 Claims, 4 Drawing Sheets

METHOD AND SYSTEM FOR MONITORING EXTERNAL EXCITATION ON A SURFACE USING NANOCOMPOSITE PAINT

FIELD OF THE INVENTION

The present invention generally relates to monitoring external excitation on a surface and more specifically, to a method and system for monitoring external excitation on a surface using nanocomposite paint.

BACKGROUND OF THE INVENTION

Generally, applying paint as a coating on surfaces of a structure for protecting, decorating, changing or improving the characteristics or performance of the underlying surfaces is a well-known technique. The structure may be, but not limited to, a wall, a building and an instrument. Typically, paints are made up of pigments, binders and a liquid that is used for lowering the viscosity of a paint composite so that the paint composite can be applied by spraying or spreading. The binders form surface films whereas the pigments are soluble or insoluble particles. Further, the liquid may be volatile or non-volatile and does not normally become part of a dried paint. The materials used as pigments, binders and liquids define the properties and applications of the paint. When paint possesses conducting and sensing capability, the paint becomes a functional or a smart paint. Smart paints may be classified into high-performance paints, property-transforming paints, and energy-exchanging paints. Due to the advancement in polymer science, there are many specially developed high-performance smart paints readily available in market today.

Many property-transforming smart paints may include basic property-transforming materials that can be manufactured in the form of fine particles. These fine particles may be used as pigment materials in the property-transforming smart paints, along with appropriate binders and liquids. Such property-transforming paints may be utilized for indicating a temperature level associated with a product by showing a change in color. Further, recent research in the development of energy exchanging composites, for e.g. conducting polymers, has led to the development of energy-exchanging smart paints. These energy-exchanging smart paints absorb energy from light, heat, chemical or other resources and remit photons to cause fluorescence, phosphorescence, or afterglow lighting. Moreover, such energy-exchanging smart paints are electricity conductive. For example, the energy-exchanging smart paints may be coated on a glass surface to make the glass surface electrically conductive thereby having the capability of 'heating up the glass'.

More recently, several attempts have resulted in the development of energy-exchanging smart paints that may be used as sensors for deformation monitoring of a surface. The currently available energy-exchanging smart paints are made by immersing a piezoelectric powder in an epoxy resin. Piezoelectric ceramic particles made of lead ziconate titanate (PZT) or barium titanate ($B_aTIO_3$) are frequently used in such energy-exchanging smart paints. Once this smart paint is applied on the surface, deformations in the surface causes expansions or contractions in the piezoelectric particles in the smart paint. This in turn generates detectable electrical signals, for example a current or a voltage. These electrical signals can be subsequently interpreted in order to assess deformation levels in the surface. However, assessing directions of the surface vibrations or deformations that produce the measured voltage, remains difficult. Further, this smart paint must be coated with layers of electrodes and then poled using very high voltage to impart the sensing capability to the energy-exchanging smart paints. In addition, expensive charge amplifiers are needed to monitor the capacitive output signals of the smart paint. Moreover, the currently available energy-exchanging smart paints are complex and very expensive for practical applications.

Therefore, there is need for an alternate energy-exchanging smart paint for monitoring of an external excitation on the surface.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
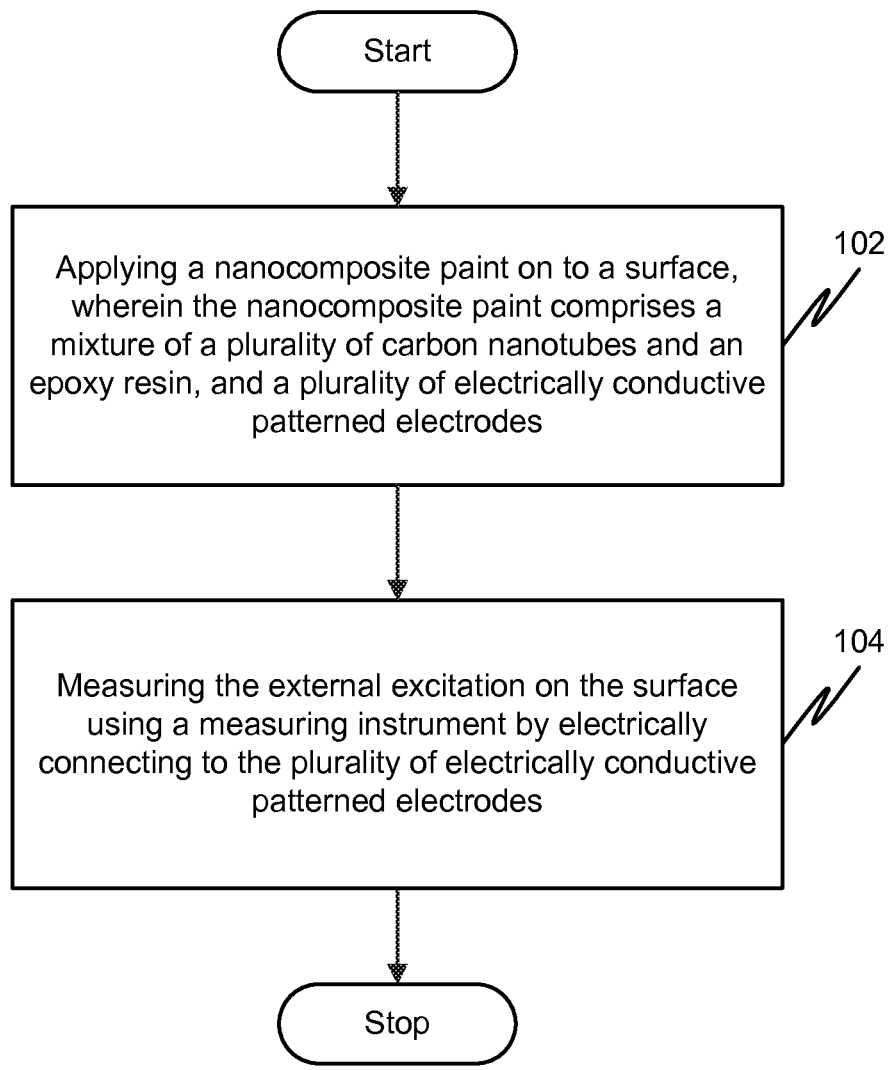
FIG. 1 illustrates a flow diagram of a method for monitoring an external excitation on a surface using nanocomposite paint in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to method and system for monitoring external excitation on a surface. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, or apparatus that comprises a list of elements does not include only those elements but may include other elements not expressly listed or inherent to such process, method, or apparatus. An element proceeded by "comprises . . . a" does not, without more constraints, preclude the existence of additional identical elements in the process, method, or apparatus that comprises the element.

Various embodiments of the invention provide methods and system for monitoring an external excitation on a surface. The method includes applying nanocomposite paint on the surface. The nanocomposite paint is an electrically conductive paint having some predefined electrical properties. These electrical properties of the nanocomposite paint changes in response to external excitation experienced by the surface. Thereafter, this change in the electrical property of the nanocomposite paint is measured to gauge the external excitation experienced by the surface.

The nanocomposite paint comprises a mixture of a plurality of carbon nanotubes and an epoxy resin, and a plurality of electrically conductive patterned electrodes. In general, carbon nanotubes are electrically conductive whereas an epoxy resin has an insulating property. Examples of a carbon nanotube of the plurality carbon nanotubes may include, but not limited to, a single-wall carbon nanotube (SWCNT), a double-wall carbon nanotube (DWCNT), a multi-wall carbon nanotube (MWCNT). In an instance, the plurality of carbon nanotubes may be a mixture of SWCNTs, DWCNTs and MWCNTs. It will be apparent to a person skilled in the art that the plurality of carbon nanotubes may include different types of carbon nanotubes in various combinations.

The epoxy resin may include, but not limited to, a glycidyl-ether, a glycidyl-ester, a glycidyl-amine and a cycloaliphatic epoxy resin. Further, examples of an electrically conductive patterned electrode of the plurality of electrically conductive patterned electrodes may include, but not limited to, a wire, a nanowire and any other electrode capable of carrying electric energy. The mixture of the plurality of carbon nanotubes with the epoxy resin makes the nanocomposite paint electrically conductive, thereby providing electrical properties to the nanocomposite paint. Once applied on the surface, the nanocomposite paint is capable of detecting the external excitation experienced on the surface. The frequency of such external excitation may vary from 0 Hertz (Hz) to acoustic frequency. Such an external excitation is detected due to change in electrical properties of the nanocomposite paint. Thus, the change in the electrical properties is directly proportional to the external excitation experienced by the surface. The process of applying the nanocomposite paint on the surface and monitoring the external excitation on the surface is explained in detail in conjunction with FIGS. 1 and 2.

Referring to the figures, FIG. 1 illustrates a flow diagram of a method for monitoring an external excitation on a surface using nanocomposite paint in accordance with an embodiment of the invention. The external excitation may include, but not limited to, a vibration, a deformation, a displacement, a noise, an acoustic disturbance and any other form of external excitation experienced by the surface. The surface may be associated with any object that is capable of experiencing the external excitation. The object may be, but not limited to, a wall, a building, floor of a building, a metal object, a plastic object, an equipment, an instrument and a wooden block. The object may be a stationary or a moving object.

At step 102, the nanocomposite paint is applied on the surface. The mixture of the plurality of carbon nanotubes along with the epoxy resin makes the nanocomposite paint electrically conductive, thereby providing electrical properties to the nanocomposite paint. These electrical properties of the nanocomposite paint are proportional to a ratio of weight of the plurality of carbon nanotubes and the epoxy resin. For example, electrical conductivity of the nanocomposite paint may be increased by increasing the quantity of carbon nanotubes in the mixture of the plurality of carbon nanotubes and the epoxy resin. On the other hand, the electrical conductivity of the nanocomposite paint may be decreased by increasing the quantity of the epoxy resin in the mixture of the plurality of carbon nanotubes and the epoxy resin.

Further, an excitation sensitivity level of the nanocomposite paint is also proportional to the ratio of weight of the plurality of carbon nanotubes and the epoxy resin. The excitation sensitivity level indicates a level of sensitivity associated with the nanocomposite paint for any excitation. Thus, in other words, the excitation sensitivity level of the nanocomposite paint depends on the electrical properties of the nanocomposite paint.

Once the nanocomposite paint is applied on the surface, the electrical properties of the nanocomposite paint changes in response to the external excitation experienced by the surface. The amount of external excitation experienced by the surface is directly proportional to the change in the electrical properties of the nanocomposite paint. The change in electrical properties may occur due to a variation in distance between carbon nanotubes of the plurality of carbon nanotubes. The process of applying the nanocomposite paint on the surface is explained in detail in conjunction with FIG. 2. Thereafter, at step 104, the external excitation experienced by the surface is measured using a measuring instrument. Examples of the measuring instrument may include, but not limited to, a current measuring instrument, a voltage measuring instrument and a resistance measuring instrument.

The measuring instrument is electrically connected to the plurality of electrically conductive patterned electrodes for measuring the change in electrical properties or a level of external excitation experienced by the surface. The change in the electrical properties of the nanocomposite paint or the level of the excitation may be indicated by a change in one or more of a voltage, a current and a resistance generated on the electrically conductive nanocomposite paint. The plurality of electrically conductive patterned electrodes may carry the change in one or more of the voltage, the current and the resistance. Such a change in one or more of the voltage, the current and the resistance is measured by the measuring instrument.

In an embodiment, external excitation in one or more of a predefined location on the nanocomposite paint coated on the surface may be measured. The predefined location of the one or more predefined locations indicates a region on the nanocomposite paint that is located between two electrically conductive patterned electrodes of the plurality of electrically conductive patterned electrodes. The nanocomposite paint in the predefined location may have its own electrical properties. In this case, in response to the external excitation experienced by the surface, the distance between the two carbon nanotubes of the plurality of carbon nanotubes at the predefined location changes. Due to this, one or more of the current, the voltage and the resistance generated at the predefined location associated with such a variation in the distance between the two carbon nanotubes is generated. This change in one or more of the current, the voltage and the resistance at the predefined location is detected and measured using the measuring instrument, thereby measuring the external excitation on the surface.

Figure 2:
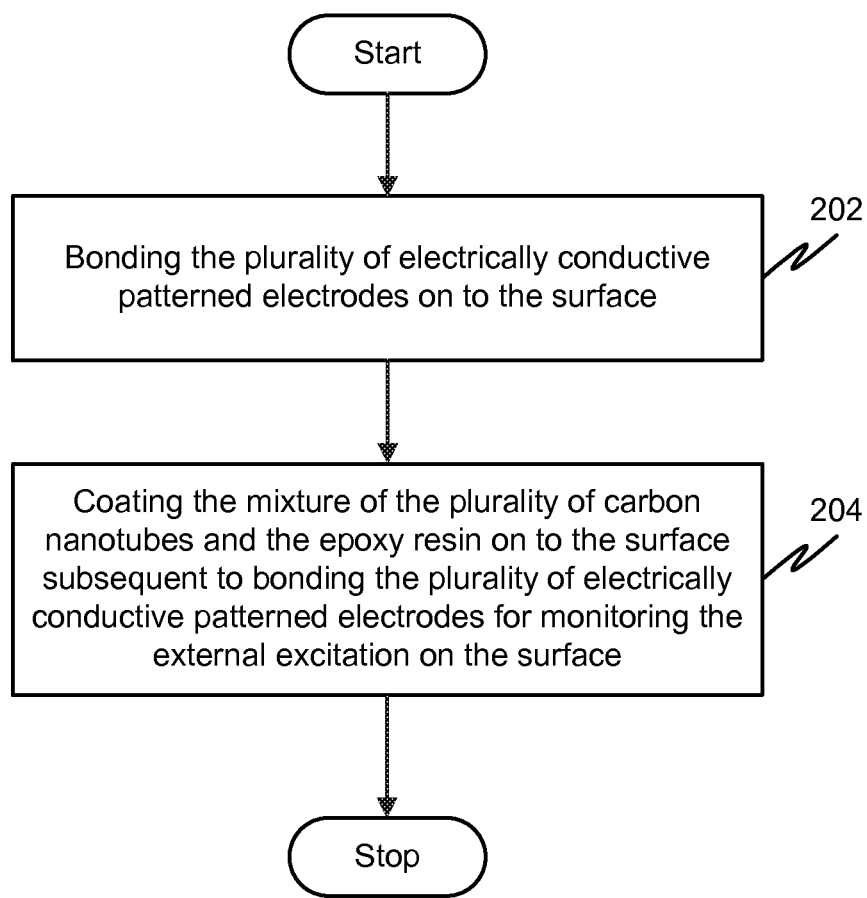
FIG. 2 illustrates a flow diagram of a method for applying nanocomposite paint on a surface in accordance with an embodiment of the invention.

FIG. 2 illustrates a flow diagram of a method for applying the nanocomposite paint on the surface in accordance with an embodiment of the invention. At step 202, the plurality of electrically conductive patterned electrodes are bonded on to the surface. In an embodiment, the plurality of the electrically conductive patterned electrodes may be bonded in such a fashion that the plurality of the electrically conductive patterned electrodes are equidistant to each other. Alternatively, the plurality of the electrically conductive patterned electrodes may be bonded in a customized manner. In this case, a user may define the manner in which the plurality of electrically conductive patterned electrodes is bonded on the surface. The plurality of electrically conductive patterned electrodes may be bonded on to the surface using any of the techniques known in the art. Further, it will be apparent to a person skilled in the art that one or more layers of plurality of electrically conductive patterned electrodes may be bonded on to the surface.

Subsequent to bonding the plurality of the electrically conductive patterned electrodes on the surface, the mixture of the plurality of carbon nanotubes and the epoxy resin is coated on to the surface at step 204. This coating is applied in such a manner that the plurality of the electrically conductive patterned electrodes is placed between the surface and the mixture of the plurality of carbon nanotubes and the epoxy resin. The mixture of the plurality of carbon nanotubes and the epoxy resin may be coated on the surface using a spraying painting technique or any other techniques known in the art. Moreover, it will be apparent to a person skilled in the art that one or more layers of the mixture of plurality of carbon nanotubes and the epoxy resin may be coated on to the surface.

Figure 3:
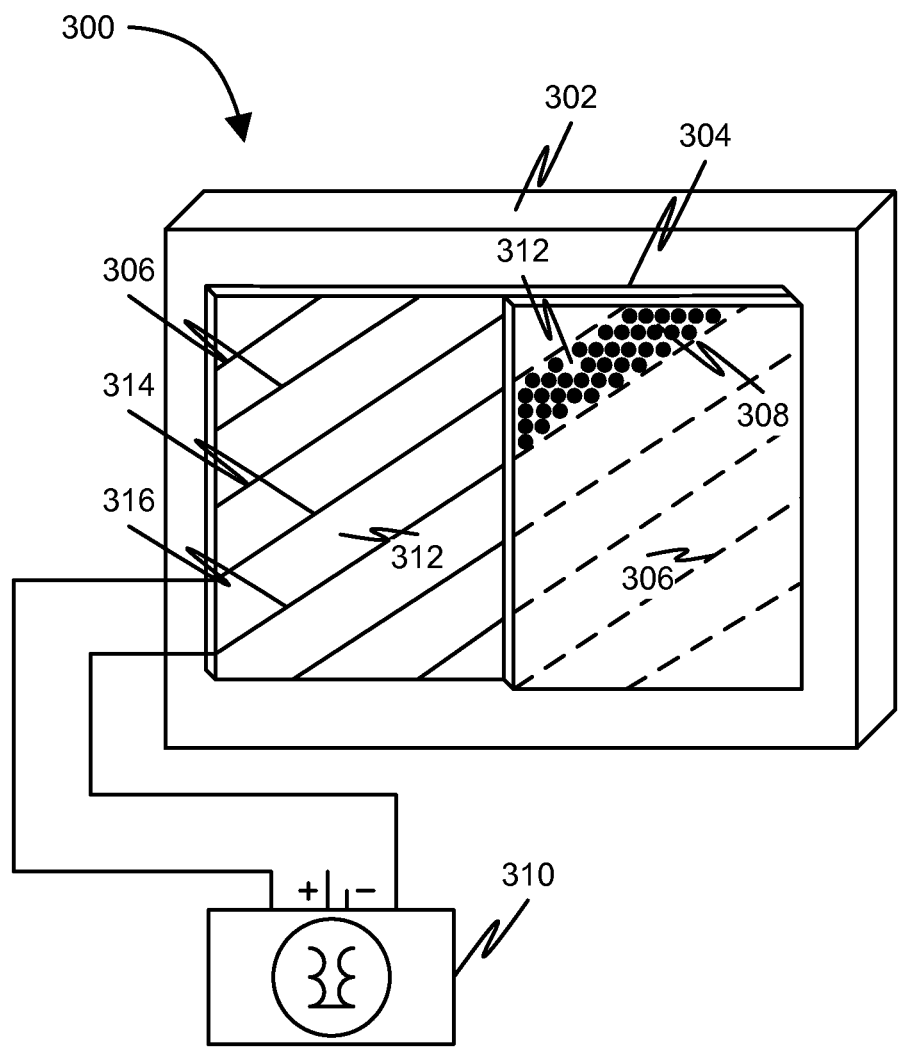
FIG. 3 illustrates a block diagram of a system for monitoring an external excitation on a surface in accordance with an embodiment of the invention.

Turning now to FIG. 3, which illustrates a block diagram of a system 300 for monitoring an external excitation on a surface 302 in accordance with an embodiment of the invention. As shown in FIG. 3, system 300 includes nanocomposite paint 304 that is coated on surface 302. Surface 302 may be associated with any object that is capable of experiencing the external excitation. The object may be, but not limited to, a wall, a building, floor of a building, a metal object, a plastic object, an equipment, an instrument and a wooden block. The object may be a stationary or a moving object. Nanocomposite paint 304 coated on surface 302, comprises a mixture of a plurality of carbon nanotubes and an epoxy resin along with a plurality of electrically conductive patterned electrodes.

In an embodiment, in a process of applying nanocomposite paint 304 on surface 302, the plurality of electrically conductive patterned electrodes 306 are bonded on to surface 302 before coating the mixture of the plurality of carbon nanotubes and the epoxy resin 308 on to surface 302. The process of applying nanocomposite paint 304 on surface 302 is explained in detail in conjunction with FIG. 2.

Upon experiencing an external excitation, surface 302 may vibrate. As a result of the excitation, distance between carbon nanotubes of the plurality of carbon nanotubes changes thereby changing the electrical properties of nanocomposite paint 304. A measuring instrument 310 is used for measuring the external excitation on surface 302. As shown in FIG. 3, measuring instrument 310 may be electrically connected to two electrically conductive patterned electrodes 316 and 314 of the plurality of electrically conductive patterned electrodes 306. Measuring instrument 310 may measure an excitation that occurs in a predefined location 312 of nanocomposite paint 304 coated on surface 302. Predefined location 312 indicates a region between the two electrically conductive patterned electrodes 316 and 314. The excitation that occurs in predefined location 312 results in variation of the distance between the two electrically conductive patterned electrodes 314 and 316. The variation of distance between the two electrically conductive patterned electrodes 314 and 316 is further explained in detail in conjunction with FIG. 4. Similarly, the distance between other electrically conductive patterned electrodes of the plurality of electrically conductive patterned electrodes 306 may also change due to the vibration of surface 302. Further, the external excitation in predefined location 312 is associated with a change in one or more of a voltage, a current and resistance generated in predefined location 312. Such a change in one or more of the voltage, the current and the resistance is measured by measuring instrument 310 thereby detecting the amount of excitation in predefined location 312. The process of measuring the one or more of the voltage, the current and the resistance generated in a predefined location on nanocomposite paint 304 is described in detail in conjunction with FIG. 4.

Figure 4:
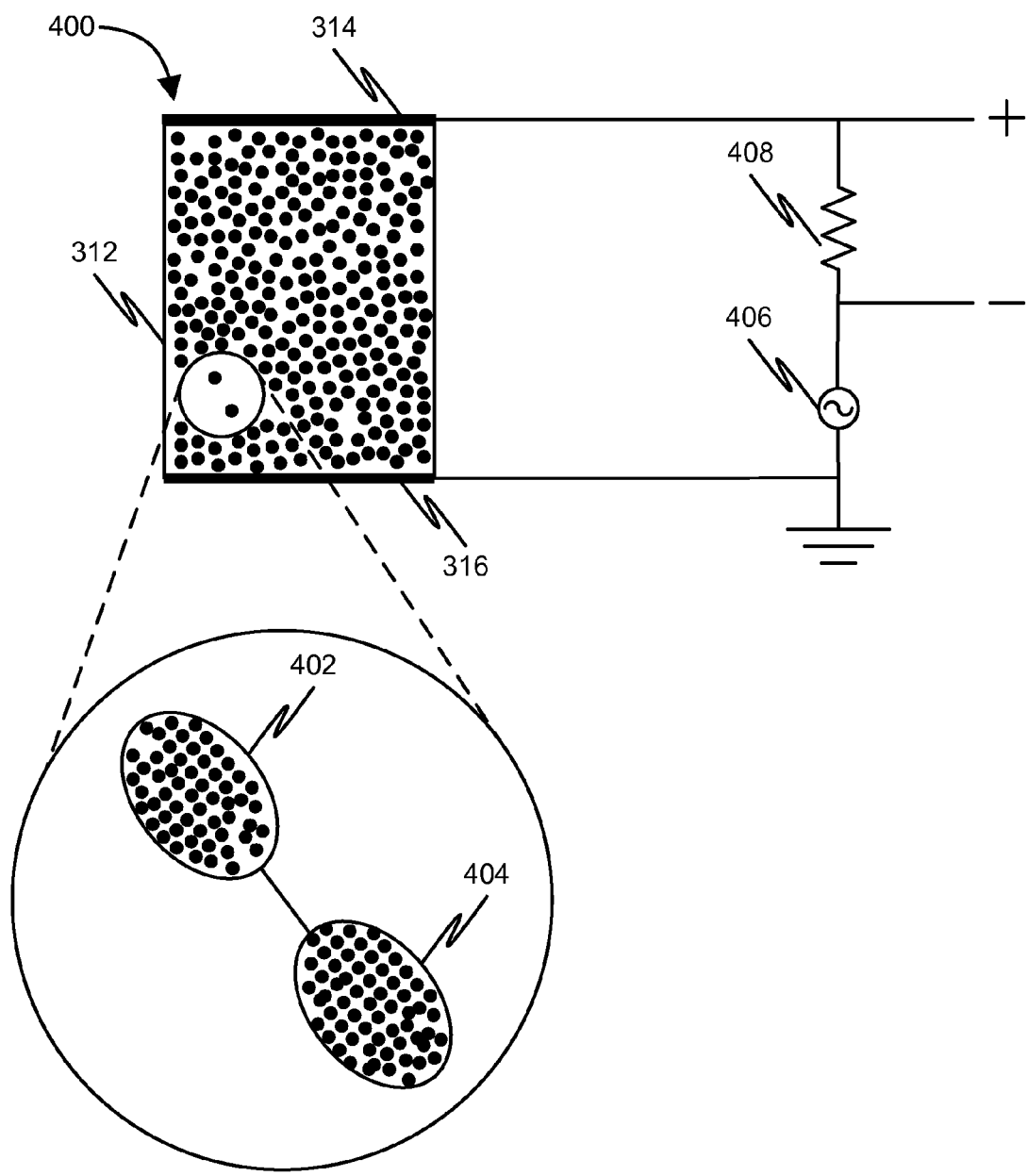
FIG. 4 illustrates a block diagram indicating two electrodes used for monitoring an external excitation experienced on a predefined location of nanocomposite paint coated on a surface in accordance with an embodiment of the invention.

FIG. 4 illustrates a block diagram indicating two electrodes used for monitoring an external excitation experienced on a predefined location on nanocomposite paint coated on a surface in accordance with an embodiment of the invention. As shown in FIG. 4, the external excitation at predefined location 312 is measured using two electrically conductive patterned electrodes 314 and 316. Predefined location 312 indicates the region on nanocomposite paint 400 coated on surface 302 (not shown in FIG. 4). Predefined location 312 on nanocomposite paint 400 coated on the surface has its own electrical properties. In response to the external excitation experienced by the surface, the distance between carbon nanotubes of the plurality of carbon nanotubes present in predefined location 312 varies. For example, distance between two carbon nanotubes 402 and 404 varies when an excitation is experienced on predefined location 312. Similarly, the distance between other carbon nanotubes within predefined location 312 may also vary due to the excitation on the surface. Due to this, one or more of the current, the voltage and the resistance is generated at predefined location 312 indicating a variation in the distance between the two carbon nanotubes 402 and 404. The change in one or more of the current, the voltage and the resistance of predefined location 312 is detected and measured using a measuring instrument (not shown in FIG. 4) for detecting the external excitation on the surface.

For measuring the external excitation on the surface, a voltage source 406 along with a series resistor 408 is electrically connected to the two electrically conductive patterned electrodes 314 and 316. Voltage source 406 along with series resistor 408 is used to provide a predetermined voltage to predefined location 312 thereby biasing the mixture of the plurality of carbon nanotubes and the epoxy resin coated on the surface. Thereafter, the measurement instrument is used to measure the voltage generated in predefined location 312. Subsequently, the surface may subjected to an external excitation. This external excitation results in change in distance between the two carbon nanotubes 402 and 404. In addition, the distance between two electrically conductive patterned electrodes 314 and 316 may change due to the external excitation. However, it will be apparent to the person skilled in the art that in absence of the external excitation the electrically conductive patterned electrodes 314 and 316 return to their original position. This change in distance between the two carbon nanotubes 402 and 404 and the two electrically conductive patterned electrodes 314 and 316 is indicated by a variation in one or more of the current, the voltage and the resistance in predefined location 312. The change in one or more of the voltage, the current and the resistance of series resistor 408 are measured using the measuring instrument (not shown in FIG. 4) to gauge the external excitation experienced by the surface. Thus, a simple and inexpensive circuit may be used for measuring the external excitation experienced by the surface thereby reducing the cost and the complexity involved in measuring the external excitation.

For example, voltage source 406 along with a series resistor 408 provides a predetermined voltage of 1 Volt (V) to predefined location 312 thereby biasing the mixture of the plurality of carbon nanotubes and the epoxy resin coated on the surface. The measurement instrument detects this bias and measures the voltage generated in predefined location 312 as 1V. Subsequently, the surface is subjected to an external excitation thereby generating a voltage. The measuring instrument detects and indicates the voltage reading as 1.5V. Therefore, the net voltage generated in the mixture of the plurality of carbon nanotubes and the epoxy resin coated on the surface due to the external excitation is 1.5V−1V=0.5V. This net voltage of 0.5V is directly proportional to the external excitation experienced by the surface.

Various embodiments of the present invention provide method and systems for monitoring external excitation on the surface. The external excitation on the surface is monitored using a nanocomposite paint coated on the surface. The external excitation may be indicated as a change in voltage, current or resistance by the nanocomposite paint. This change in the voltage, the current or the resistance can be measured using an inexpensive electrical circuit thereby reducing the cost and complexity associated with setting up complex circuits in measuring the external excitation experienced by the surface. Further, the nanocomposite paint can be easily manufactured and can detect excitation frequency varying from 0 Hertz to acoustic frequency. In addition, the nanocomposite paint can monitor external excitation on the surface at a discrete location (i.e., point sensing mode) or multi-adjacent locations (i.e., distributed sensing mode). Moreover, the nanocomposite paint can be applied on to any surfaces having complex shapes.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A nanocomposite paint for monitoring a mechanical excitation on a surface, the nanocomposite paint comprising:
    a mixture of a plurality of carbon nanotubes and an epoxy resin; and
    a plurality of electrically conductive patterned electrodes, wherein the mixture of the plurality of carbon nanotubes and the epoxy resin is coated on to the surface subsequent to bonding the plurality of electrically conductive patterned electrodes on to the surface for monitoring the mechanical excitation on the surface, whereby an electrical property of the nanocomposite paint changes in response to the mechanical excitation of the surface.

2. The nanocomposite paint of claim 1, wherein a ratio of weight of the plurality of carbon nanotubes and the epoxy resin is associated with an excitation sensitivity level of the nanocomposite paint.

3. The nanocomposite paint of claim 1, wherein the mechanical excitation is one of a vibration, a displacement, a deformation, a noise and an acoustic disturbance.

4. The nanocomposite paint of claim 1, wherein a carbon nanotube of the plurality of carbon nanotubes is one of a single-walled carbon nanotube (SWNT), a double-wall carbon nanotube (DWCT) and a multi-wall carbon nanotube (MWCT).

5. The nanocomposite paint of claim 1, wherein the epoxy resin is one of a glycidyl-ether, a glycidyl-ester, a glycidyl-amine and a cycloaliphatic epoxy resin.

6. The nanocomposite paint of claim 1, wherein the mechanical excitation is monitored by measuring at least one of a current, a voltage and a resistance generated in at least one predefined location on the nanocomposite paint coated on to the surface.

7. The nanocomposite paint of claim 6, wherein at least one of the current, the voltage and the resistance is associated with a variation in distance between two carbon nanotubes of the plurality of carbon nanotubes, the variation in the distance is developed by the mechanical excitation on the surface.

8. The nanocomposite paint of claim 6, wherein a predefined location of the at least one predefined location indicates a region on the nanocomposite paint coated on to the surface, the predefined location is located between two electrically conductive patterned electrodes of the plurality of electrically conductive patterned electrodes.

9. A system for monitoring a mechanical excitation on a surface, the system comprising:
    a nanocomposite paint, wherein the nanocomposite paint comprises:
    a mixture of a plurality of carbon nanotubes and an epoxy resin, and
    a plurality of electrically conductive patterned electrodes, wherein the mixture of the plurality of carbon nanotubes and the epoxy resin is coated on to the surface subsequent to bonding the plurality of electrically conductive patterned electrodes on to the surface for monitoring the mechanical excitation on the surface, whereby an electrical property of the nanocomposite paint changes in response to the mechanical excitation of the surface; and
    a measuring instrument capable of electrically connecting to the plurality of electrically conductive patterned electrodes for measuring the mechanical excitation on the surface.

10. The system of claim 9, wherein a ratio of weight of the plurality of carbon nanotubes and the epoxy resin is associated with an excitation sensitivity level of the nanocomposite paint.

11. The system of claim 9, wherein the measuring instrument detects at least one of a current, a voltage and a resistance generated in at least one predefined location on the nanocomposite paint coated on to the surface to measure the mechanical excitation on the surface.

12. The system of claim 11, wherein at least one of the current, the voltage and the resistance is associated with a variation in distance between two carbon nanotubes of the plurality of carbon nanotubes, the variation in the distance is developed by the mechanical excitation on the surface.

13. The system of claim 11, wherein a predefined location of the at least one predefined location indicates a region on the nanocomposite paint coated on the surface, the predefined location is located between two electrically conductive patterned electrodes of the plurality of electrically conductive patterned electrodes.

14. A method of monitoring a mechanical excitation on a surface, the method comprising:

applying a nanocomposite paint on to the surface, wherein the nanocomposite paint comprises:
a mixture of a plurality of carbon nanotubes and an epoxy resin, and
a plurality of electrically conductive patterned electrodes, wherein an electrical property of the nanocomposite paint changes in response to the mechanical excitation of the surface; and
measuring the mechanical excitation using a measuring instrument by electrically connecting to the plurality of electrically conductive patterned electrodes, wherein the mechanical excitation is at least one of a vibration, a displacement, a deformation, a noise and an acoustic disturbance.

15. The method of claim 14, wherein applying the nanocomposite paint on to the surface comprises:
bonding the plurality of electrically conductive patterned electrodes on to the surface; and
coating the mixture of the plurality of carbon nanotubes and the epoxy resin on to the surface subsequent to bonding the plurality of electrically conductive patterned electrodes for monitoring the mechanical excitation on the surface.

16. The method of claim 14, wherein a ratio of weight of the plurality of carbon nanotubes and the epoxy resin is associated with an excitation sensitivity level of the nanocomposite paint.

17. The method of claim 14, wherein the mechanical excitation is at least one of a vibration, a displacement, a deformation, a noise and an acoustic disturbance.

18. The method of claim 14, wherein measuring the mechanical excitation on the surface comprises detecting at least one of a current, a voltage and a resistance generated in at least one predefined location on the nanocomposite paint coated on to the surface.

19. The method of claim 18, wherein at least one of the current, the voltage and the resistance is associated with a variation in distance between two carbon nanotubes of the plurality of carbon nanotubes, the variation in the distance is developed by the mechanical excitation on the surface.

20. The method of claim 18, wherein a predefined location of the at least one predefined location indicates a region on the nanocomposite paint coated on to the surface, the predefined location is located between two electrically conductive patterned electrodes of the plurality of electrically conductive patterned electrodes.

* * * * *